(12) United States Patent
Clark et al.

(10) Patent No.: US 7,765,402 B2
(45) Date of Patent: Jul. 27, 2010

(54) SYSTEM AND METHODS FOR THE WIRELESS DELIVERY OF A MESSAGE

(75) Inventors: David Clark, Kitchener (CA); David Bajar, Kitchener (CA); Simon Wise, Waterloo (CA); Ian M. Patterson, Petersburg (CA); David Yach, Waterloo (CA); Allan David Lewis, New Dundee (CA); Gary P. Mousseau, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 980 days.

(21) Appl. No.: 11/305,268

(22) Filed: Dec. 16, 2005

(65) Prior Publication Data

US 2007/0105570 A1   May 10, 2007

Related U.S. Application Data

(60) Provisional application No. 60/734,396, filed on Nov. 8, 2005.

(51) Int. Cl.
*H04L 9/32* (2006.01)
*H04H 60/09* (2008.01)
*G06F 7/04* (2006.01)
*H04N 7/16* (2006.01)
*G06F 13/00* (2006.01)

(52) U.S. Cl. ........................ 713/168; 455/3.04; 726/29; 340/825; 380/209; 380/210; 380/240; 380/271; 380/272

(58) Field of Classification Search .................. 713/168; 726/29; 455/3.04; 340/825; 380/209, 210, 380/240, 271, 272
See application file for complete search history.

(56) References Cited

U.S. PATENT DOCUMENTS

| 5,930,361 | A | * | 7/1999 | Hayashi et al. | 380/210 |
| 2003/0084291 | A1 | * | 5/2003 | Yamamoto et al. | 713/168 |
| 2004/0193876 | A1 | * | 9/2004 | Donley et al. | 713/162 |
| 2006/0088163 | A1 | * | 4/2006 | Carmichael | 380/210 |
| 2007/0121946 | A1 | * | 5/2007 | Ito et al. | 380/270 |

OTHER PUBLICATIONS

Stallings, William. Network Security Essentials: Applications and Standards. Nov. 1999, Prentice-Hall, Inc., pp. 170-172.*

* cited by examiner

*Primary Examiner*—Michael J Simitoski
(74) *Attorney, Agent, or Firm*—John J. Oskorep, Esq.

(57) ABSTRACT

Systems and methods for a wireless communication system used for transmitting and receiving information, the information not containing identification of the information's intended recipient. A method for transmitting payload information, the method comprising providing verification information scrambling a portion of the verification information and transmitting the payload information with the scrambled verification information portion. Also provided is a method for processing transmitted payload information incorporated into an encoded information message with scrambled verification information, the method comprising receiving the encoded information message descrambling at least a portion of the scrambled verification information and comparing said descrambled verification information with predetermined verification information processing said payload information based on said comparison.

34 Claims, 8 Drawing Sheets

SYSTEM AND METHODS FOR THE WIRELESS DELIVERY OF A MESSAGE

CROSS-REFERENCE TO RELATED APPLICATION(S)

This patent application is related to the subject matter disclosed in the following commonly owned provisional application: "SYSTEM AND METHODS FOR THE WIRELESS DELIVERY OF A MESSAGE," filed 8 Nov. 2005, Application No. 60/734,396 (RIM No. 30542-ID) in the name(s) of: David Clark, David Bajar, Simon Wise, Ian Patterson, David Yach, Allan Lewis and Gary Mousseau; all of which is incorporated by reference herein.

TECHNICAL FIELD

This application relates to wireless communication techniques in general, and specifically to a system and methods for the wireless delivery of a message.

BACKGROUND

In a wireless communications system designed to deliver data to a wireless mobile communication device ("mobile device") such as a cellular telephone, a two-way pager, a wireless communication capable personal digital assistant ("PDA"), and other similar devices, there exist methods for formatting messages to enable data delivery. Data messages will frequently include a type of wrapper, or header, which is used to package a data payload. These headers traditionally include, among other information, the address of the intended recipient of the data message. The inclusion of the recipient device's address in the message header is typically used by a recipient to properly assess whether it is the intended recipient of the message. Including the recipient's address has two limitations: The inclusion of the recipient's address can add unnecessary bulk to a message and the inclusion of the recipient's address as the factor for determining to whom the message is addressed opens itself up to message spoofing attacks.

To avoid these limitations, it would be desirable to omit the inclusion of the recipient's address. However, conventional wireless systems present challenges if the recipient's address is removed.

For example, in a first type of conventional network, a Mobitex network for example, messages are broadcast and a mobile communications device must be able to accurately assess whether it is the intended recipient of the message. In this type of network, the traditional method used to address the problem of a mobile communications device assessing whether it is the intended recipient of a message is to add the recipient mobile communications device's address to the message so that a receiving mobile communications device can check the message to see if it includes its own address and is therefore destined for it. If the recipient mobile communications device's address is removed from a message this method can no longer function as required.

In a second type of conventional network, a General Packet Relay Service (GPRS) network for example, messages are readdressed to a mobile communications device, by a network node, using an internet protocol (IP) address which has been assigned to the mobile communications device by the network node and is separate and distinct from the mobile communications device's address. One feature of this type of network is that IP addresses are frequently reassigned to different mobile communications devices, when, for example, a mobile communications device is turned off or switches networks. In order to ensure that a message has been received by the correct mobile communications device, a mobile communications device cannot rely on examining the IP address but needs a mechanism which can be used to accurately assess an incoming message. If the recipient mobile communications device's address is removed from a message this method can no longer function as required.

BRIEF DESCRIPTION OF THE DRAWINGS

A better understanding of the present invention will be obtained by considering the detailed description below, with reference to the following drawings.

DETAILED DESCRIPTION OF THE DRAWINGS

Figure 1:
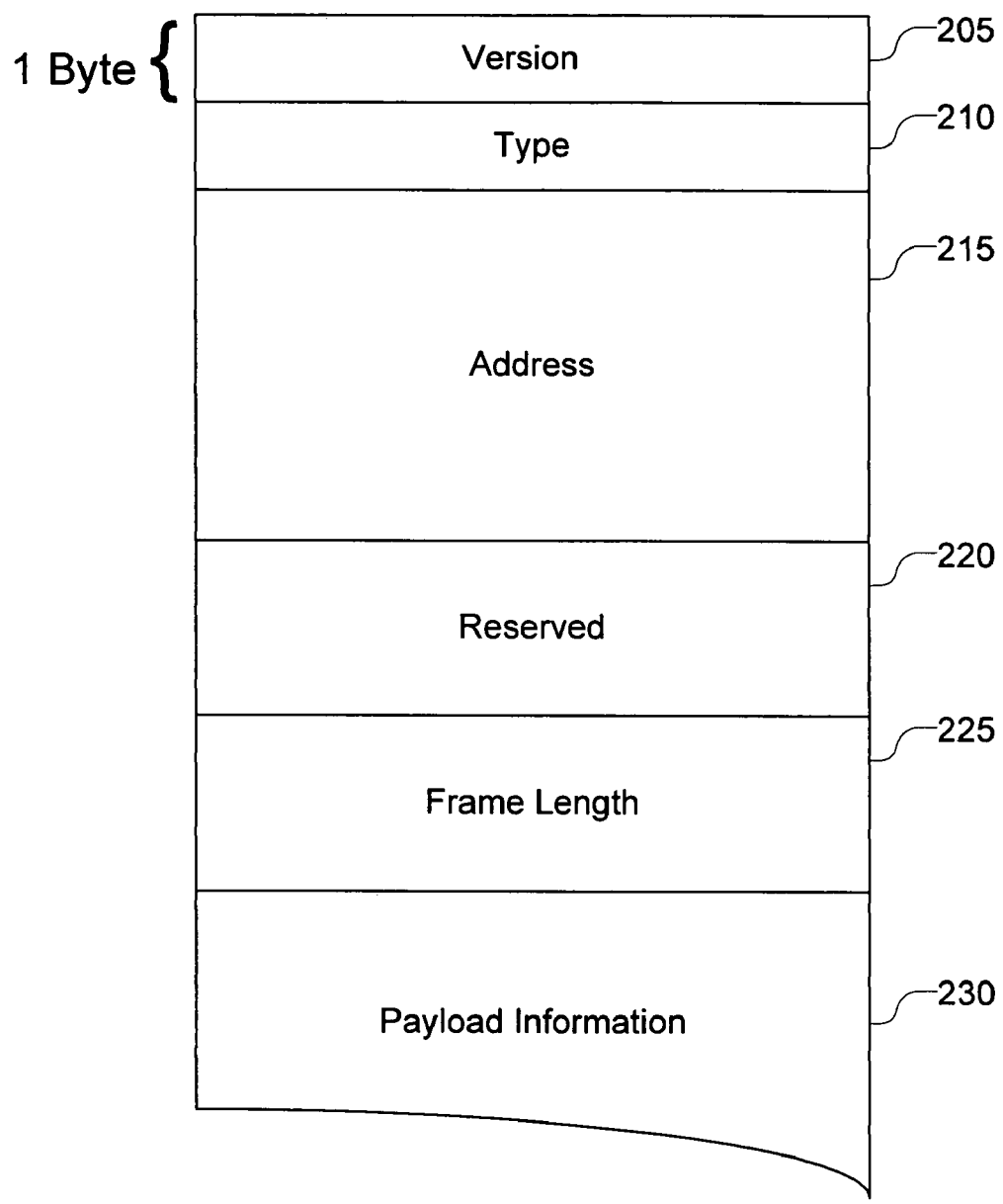
FIG. 1 is an exemplary block diagram illustrating a conventional information message including both a header and payload information.

A system and method will now be described with reference to various examples of how the embodiments can best be made and used. Like reference numerals are used throughout the description and several views of the drawings to indicate like or corresponding parts, wherein the various elements are not necessarily drawn to scale.

Description is made of systems and methods for enabling wireless message delivery. These systems and methods improve on the state of the art by enabling accurate and secure communication of information messages without including the recipient's address.

In one embodiment, this is disclosed a method for transmitting payload information, the method comprising providing verification information, scrambling a portion of the verification information and transmitting the payload information with the scrambled verification information portion.

In another embodiment, is disclosed a method for processing transmitted payload information incorporated into an encoded information message with scrambled verification information, the method comprising receiving the encoded information message descrambling at least a portion of the scrambled verification information and comparing said descrambled verification information with predetermined verification information processing said payload information based on said comparison.

In yet another embodiment, is disclosed a computing device adapted for transmitting payload information, the computing device comprising an information providing module adapted to provide verification information and a scrambling module adapted to scramble a portion of the verification information wherein the information providing module is further adapted to transmit the payload information with the scrambled verification information portion.

In yet another embodiment is disclosed a computing device adapted for receiving transmitted payload information incorporated into an encoded information message with scrambled verification information, the computing device comprising a receiving module adapted to receive the encoded information message a descrambling module adapted to descramble at least a portion of the scrambled verification information a comparing module adapted to compare said descrambled verification information portion with predetermined verification information and a processing module adapted to process said payload information based on said comparison.

Herein disclosed is a system intended for the wireless delivery of messages between multiple end points. These end points can be any computing device capable of sending and receiving payload information, but are preferably either servers or mobile devices where the servers act as intermediaries, sending and receiving payload information, in the form of encoded information messages, to and from external servers as well as to and from mobile devices. The external servers may include mail servers or web servers for example. In one embodiment there is provided a system for delivering payload information, wherein the payload information is sent as encoded information messages where the payload information is packaged with verification information so that it is not necessary to include the recipient's address to assess validity of the payload information. These encoded information messages are sent from a server to a mobile device or from a mobile device to a server and can include such messages as email or other data messages. The verification information is encoded and added to the payload information to form an encoded information message. The intended recipient of the encoded information message will be able to decode the encoded information message using a shared key and verify that they are indeed the intended recipient of the payload information by verifying that the verification information portions of the encoded information message match a previously shared or decided upon format for the verification information. Throughout this document the term encoded information message shall refer to a set of data capable of being transmitted and properly verified by the intended recipient, comprising both payload information and verification information. Throughout this document, the term payload information shall refer to a payload portion of an information message. The term verification information shall refer to those portions of an information message which are used to package and verify payload information.

FIG. 1 is an exemplary block diagram illustrating conventional information message 200, which includes both payload information 230 and packaging information, in this example the packaging information is a header (comprising 205, 210, 215, 220 and 225). The header is used to identify and describe the payload information 230. This header/payload model is quite well known to those in the art and is included here for informational purposes only. As is conventional, address field 215 includes the address of message 200's intended recipient so that upon receipt of message 200, a recipient can check address field 215 to verify that it is the intended recipient of the information contained in information message 200. It is well known in the art that payload information 230 could be a complete message or could be a portion of a message which can be reassembled to form an entire message. For example, a long email message could be divided into multiple payload information segments for transmission. In a conventional information message 200 the header is composed of the following fields:

1. Version field 206 is an 8-bit field identifying the protocol version of the encoded information message's header
2. Type field 211 is an 8-bit field which contains the following four subfields (not shown):
    Error field: A 3-bit field indicating a possible error status
    Packet Type: a 2-bit field indicating the type of the payload information
    Reserved Flags: 2 bits of flags which are typically set to zero and are reserved for future consideration.
    Address Flag: one bit indicating whether the Address field is populated.
3. Address field 216 is a 32-bit field containing an address of the handheld.
4. Reserved Field 221 is a 16-bit field which are typically set to zero and is reserved for future consideration.
5. Frame Length 226 is a 16-bit field indicating the frame length of the entire packet (i.e. the information header size plus the payload information size).

Figure 2:
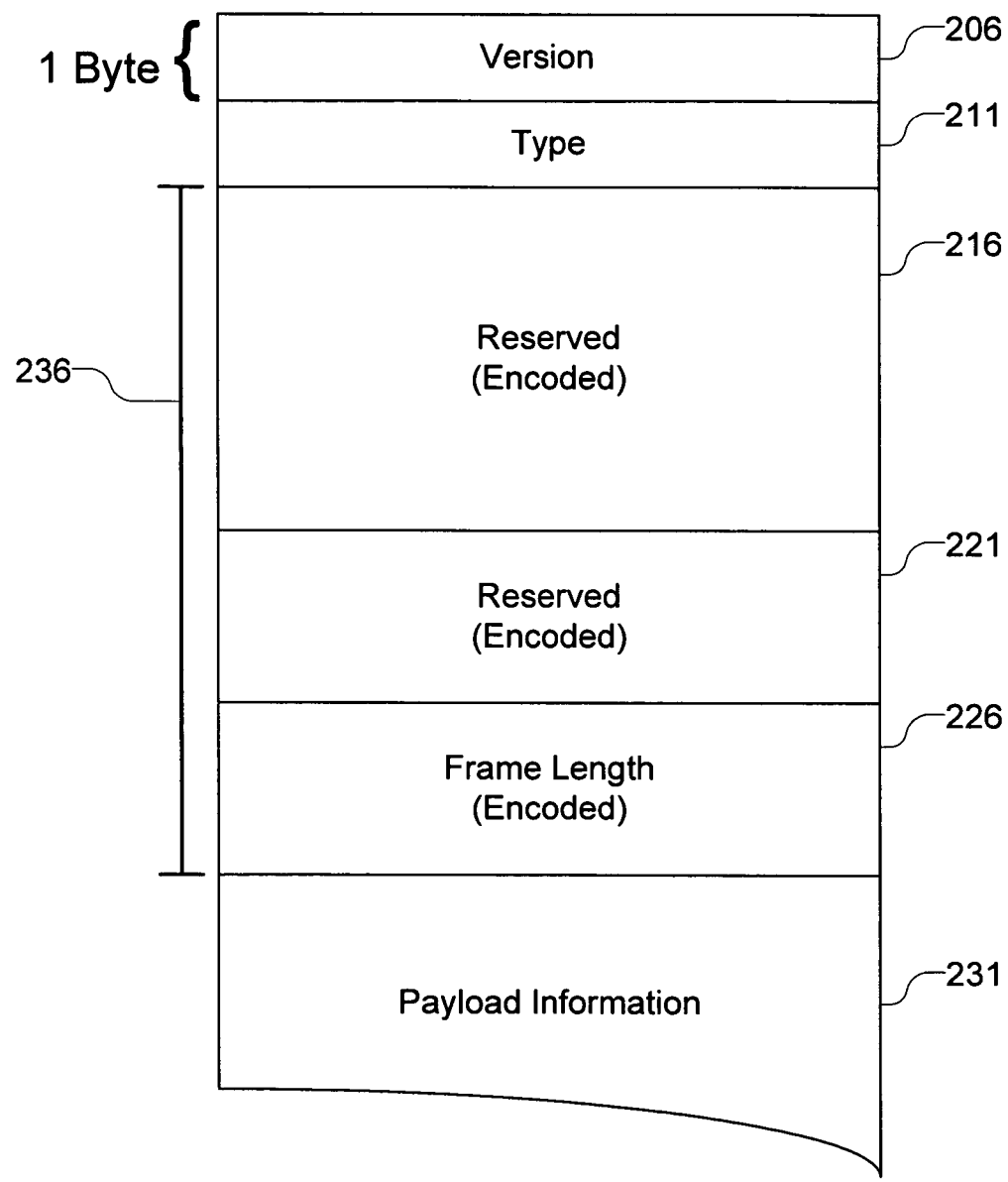
FIG. 2 is an exemplary block diagram illustrating an encoded information message including both verification and payload information according to a preferred embodiment.

FIG. 2 is an exemplary block diagram illustrating encoded information message 201. In the preferred embodiment, encoded information message 201 is a message with fields structured similarly to those of a conventional information message (eg. 200) but which does not actually contain a destination address. Encoded information message 201 is formed of two separate parts, header (206, 211, 216, 221 and 226) and payload information 231. Payload information 231 is the contents or body of information which needs to be communicated and could for example be the text or the portion of the text of an email message. Header (206, 211, 216, 221 and 226) contains certain fields which help to identify and verify the payload information 231. In a preferred embodiment, the header (206, 211, 216, 221 and 226) contains verification information 236, in place of conventional packaging information. Verification information 236 is known to both the sender and the receiver of encoded information message 201. The actual meaning or content of verification information 236 can be of value, but for the purposes of the preferred embodiment, the only requirement of the verification information 236 is that it be known to both the sender and the receiver of encoded information message 201 so that both of them can encode and/or decode the encoded information message 201. Verification information 236 can be of any size, FIG. 2 shows verification information 236 as 8 bytes for example only. In the embodiment shown if FIG. 2, header (206, 211, 216, 221 and 226) is composed of the following five fields:

1. Version field 206 is an 8-bit field identifying the protocol version of the encoded information message's header
2. Type field 211 is an 8-bit field which contains the following four subfields (not shown):
    Error field: A 3-bit field indicating a possible error status
    Packet Type: a 2-bit field indicating the type of the payload information
    Reserved Flags: 2 bits of flags which are typically set to zero and are for future consideration.
    Address Flag: one bit indicating whether the Address field is populated.
3. Reserved field 216 is a 32-bit field containing verification information which is known to both the sender and receiver of the information message.

4. Reserved Field 221 is a 16-bit field containing verification information which is known to both the sender and receiver of the information message.
5. Frame Length 226 is a 16-bit field indicating the frame length of the entire packet (i.e. header size plus the payload information size).

Figure 3:
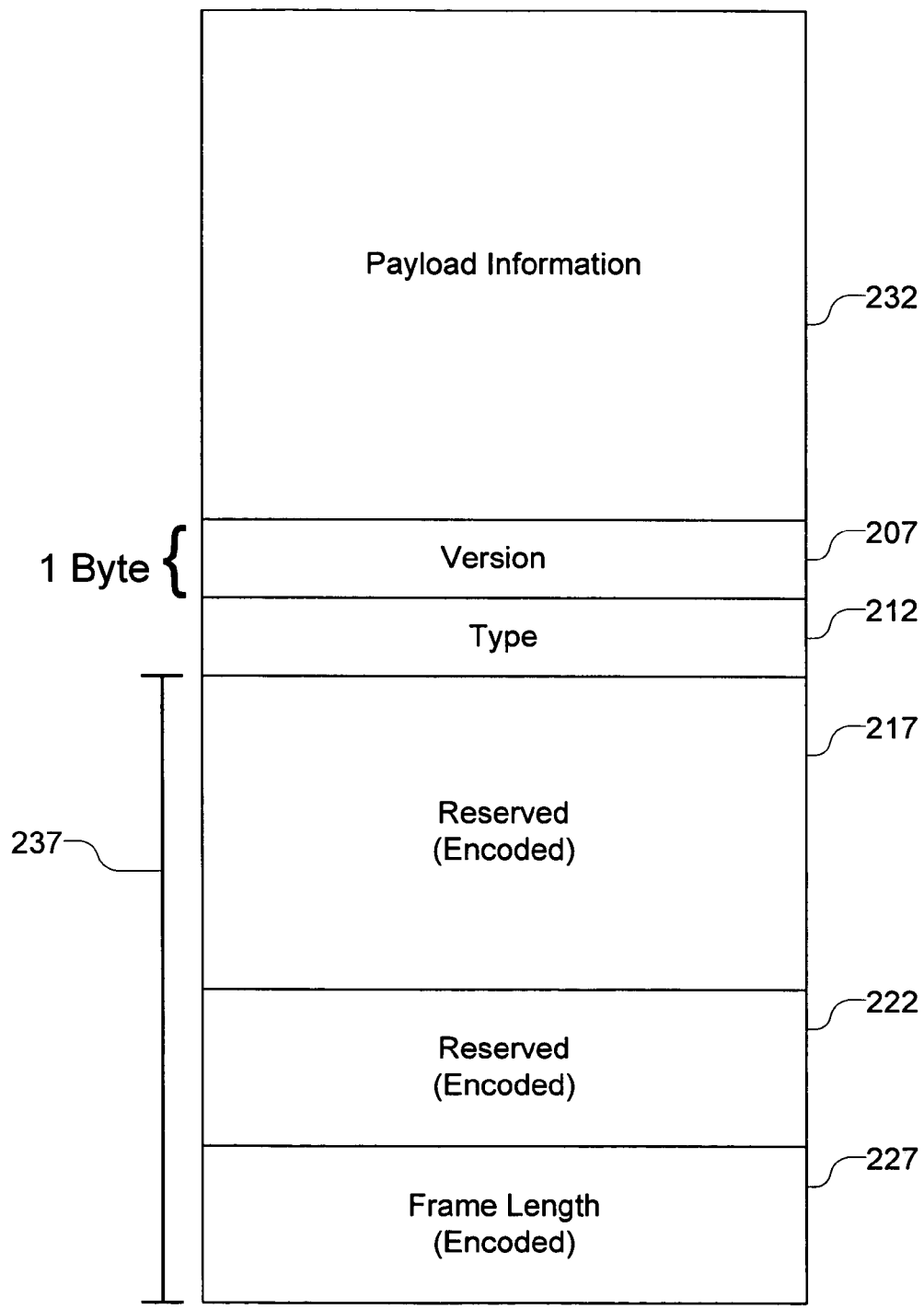
FIG. 3 is an exemplary block diagram illustrating an encoded information message including both verification and payload information according to another preferred embodiment.

FIG. 3 is another example of an encoded information message 202 according to another preferred embodiment. This figure describes one possible embodiment of payload information 232 and the associated verification information 237. In this embodiment, the payload information 232 is a message and verification information 237 is included in a footer and is appended to the message. Encoded information message 202 is an exemplary embodiment of a message which does not contain a destination address and can be sent between mobile communications device and host services and servers. Encoded information message 202 can be divided into two separate parts, the footer (207, 212,217, 222 and 227) and payload information 232. Payload information 232 is the contents or body of information which needs to be communicated and could for example be the text of an email message. The footer contains certain fields which help to identify and verify the message, and in particular contains verification information 237 which is known to both the sender and the receiver of encoded information message 202. Verification information 237 replaces conventional packaging information. The actual meaning or content of verification information 237 can be of value, but for the purposes of the preferred embodiment, the only requirement of the verification information 237 is that it be known to both the sender and the receiver of encoded information message 202 so that both of them can encode and decode the encoded information message 202 and verify that it is correct.

Figure 4:
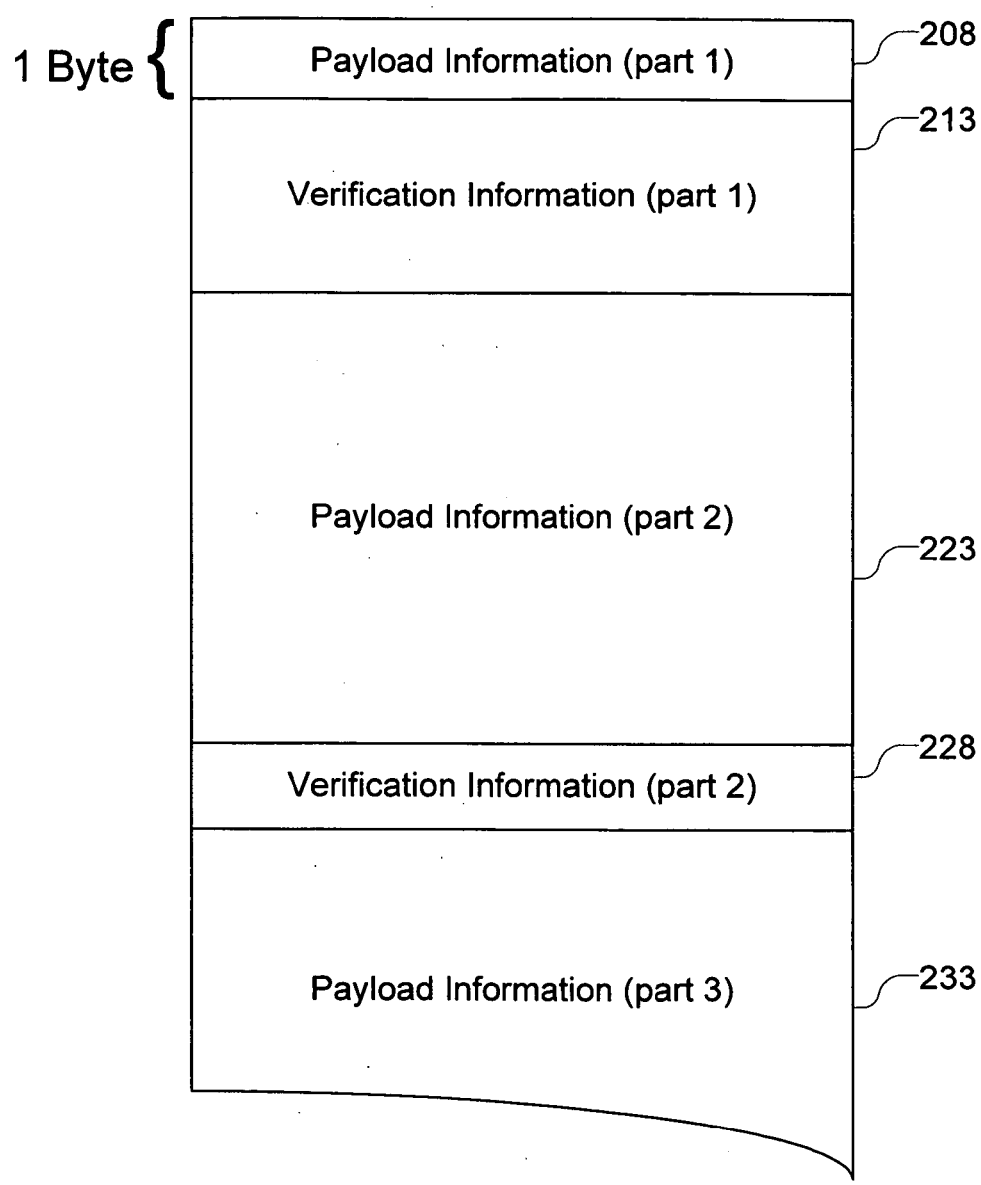
FIG. 4 is an exemplary block diagram illustrating an encoded information message including both verification and payload information according to yet another preferred embodiment.

FIG. 4 is another example of an encoded information message 203 according to yet another preferred embodiment. In this embodiment, the payload information is divided into pieces. Specifically payload information has been divided into payload information (part 1) 208, payload information (part 2) 223 and payload information (part 3) 233. Payload information is divided into three parts (208, 223 and 233) as an example only and could be divided in any manner; parts 208, 223 and 233 are an example used for illustrative purposes only. The verification information is included in encoded information message 203 in two parts, verification information (part 1) 213 and verification information (part 2) 228. Verification information is divided into two parts as an example only and could be divided in any manner; parts 213 and 228 are an example used for illustrative purposes only. Both the sender and receiver of encoded information message 203 must know the location of the verification information parts 213 and 228. The actual meaning or content of verification information 213 and 228 can be of value, but for the purposes of the preferred embodiment, the only requirement of the verification information 213 and 228 is that they be known to both the sender and the receiver of encoded information message 203 so that both of them can encode and decode the encoded information message 203 and verify that it is correct. It is to be understood that encoded information message 303 could be composed of more or fewer parts of both payload information and verification information. In a preferred embodiment, verification information parts would be of consistent length and would occur at consistent intervals within the payload information, for example 1 byte in length, occurring at intervals of 8 bytes within the payload information.

Figure 5:
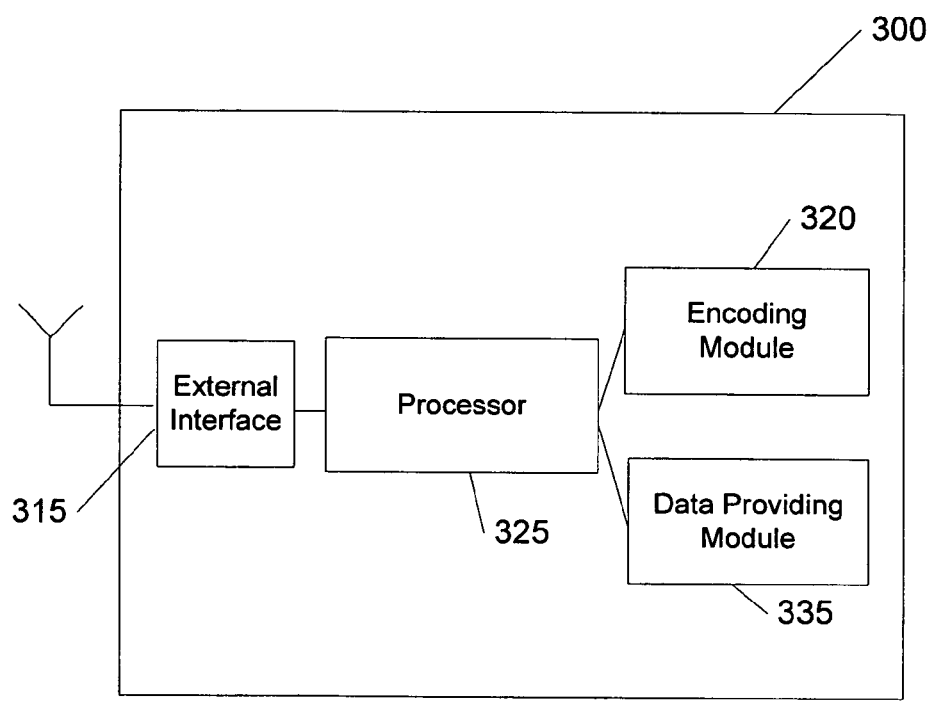
FIG. 5 is an exemplary block diagram illustrating an apparatus capable of encoding information, and sending an encoded information message.

FIG. 5 is an exemplary block diagram illustrating an apparatus capable of encoding payload information with verification information into an encoded information message, and sending the encoded information message. Apparatus 300 depicted in FIG. 5 is a mobile device, with external interface 315 as its means of communicating with external entities. In the embodiment shown in FIG. 5, external interface 315 is preferably a radio capable of communication with cellular networks, such as GSM, GRPS, UMTS, EVDO, CDMA and EDGE networks. It will be easily understood by those in the art that FIG. 5 could alternatively describe a server wherein external interface 315 is a network interface card or modem for communicating with external entities through internet protocols such as TCP/IP or UDP. In this alternative example, the server would communicate with external servers, such as a mail server or a data server and could as a host service capable of sending and receiving encoded information messages to and from mobile communications devices. As a mobile device, apparatus 300 contains processor 325 which functions as a central processing unit (CPU). Processor 325 is adapted to execute encoding module 320 to encode information messages. This encoding process involves encoding verification information and combining it with the payload information to form an encoded information message. The payload information, consisting of payload 230 for example, can be encrypted or unencrypted data, compressed data or uncompressed data, the specific properties of the data are not material to the embodiments described herein. The encoded information message is generated by combining the appropriate verification information payload information at appropriate locations (see examples in FIGS. 2, 3 and 4). In order to have the recipient validate that it is the intended recipient of the encoded information message, the verification information is encoded in a manner which is reversible only with the knowledge of a shared key. The shared key (not shown) is transacted at an earlier point and is known by two entities (a relay services node and a mobile communications device for example) and can be used between the two to ensure the validity of a message. The preferred embodiment uses a Secure Hash Algorithm (SHA1) hash value as a shared key, but this could be any other data which is operable as a key. By encoding the verification information using a shared key, the risk of spoofing attacks can be significantly reduced. Instead of requiring knowledge of only a mobile communications device's address, an attacker must know a shared key. The verification information is encoded and combined with payload information to form an encoded information message using the method described in FIG. 7. Once the verification information and payload information have been properly encoded into an encoded information message, processor 325 will execute data providing module 335 which operates to transmit the encoded information message to its intended recipient using external interface 315. Data providing module 335 is preferably software and is adapted to execute in processor 325 to send and receive encoded information messages.

Figure 6:
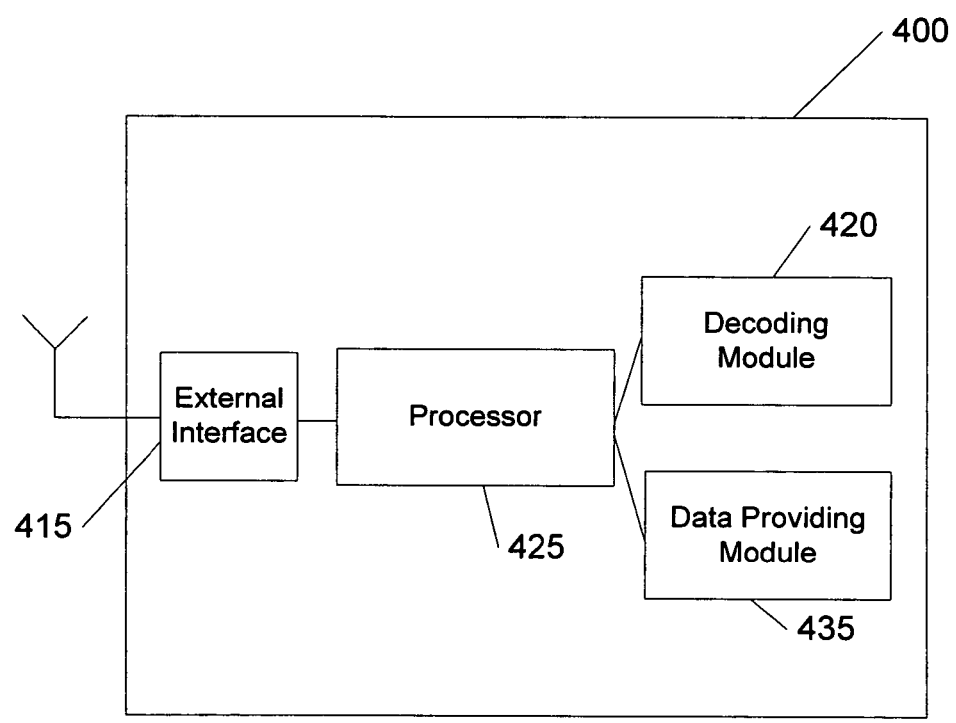
FIG. 6 is an exemplary block diagram illustrating an apparatus capable of receiving an encoded information message and decoding the received encoded information message.

FIG. 6 is an exemplary block diagram illustrating an apparatus capable of receiving an encoded information message and decoding the encoded information message. Apparatus 400 depicted in FIG. 6 is a mobile device, with external interface 415 as its means of communicating with external entities In the embodiment shown in FIG. 6, external interface 315 is preferably a radio capable of communication with cellular networks, such as GSM, GRPS, UMTS, EVDO, CDMA and EDGE networks. It will be easily understood by those in the art that the apparatus shown in FIG. 6 could alternatively be a server wherein external interface 315 is a network interface card or modem for communicating with external entities through internet protocols such as TCP/IP or UDP. Apparatus 400 contains processor 425 which functions as a central processing unit (CPU). Processor 425 is adapted to execute decoding module 420 to decode an encoded information message into information. This decoding process involves decoding an encoded information description using a message's payload and a shared key to ensure that the message has been received by the intended recipient. The payload information 230, can be encrypted data or unencrypted data, compressed data or uncompressed data, the specific properties of the data are unimportant to the functioning of this apparatus. A received message is decoded and validated as a message intended for an apparatus by using the method described in FIG. 8.

Figure 7:
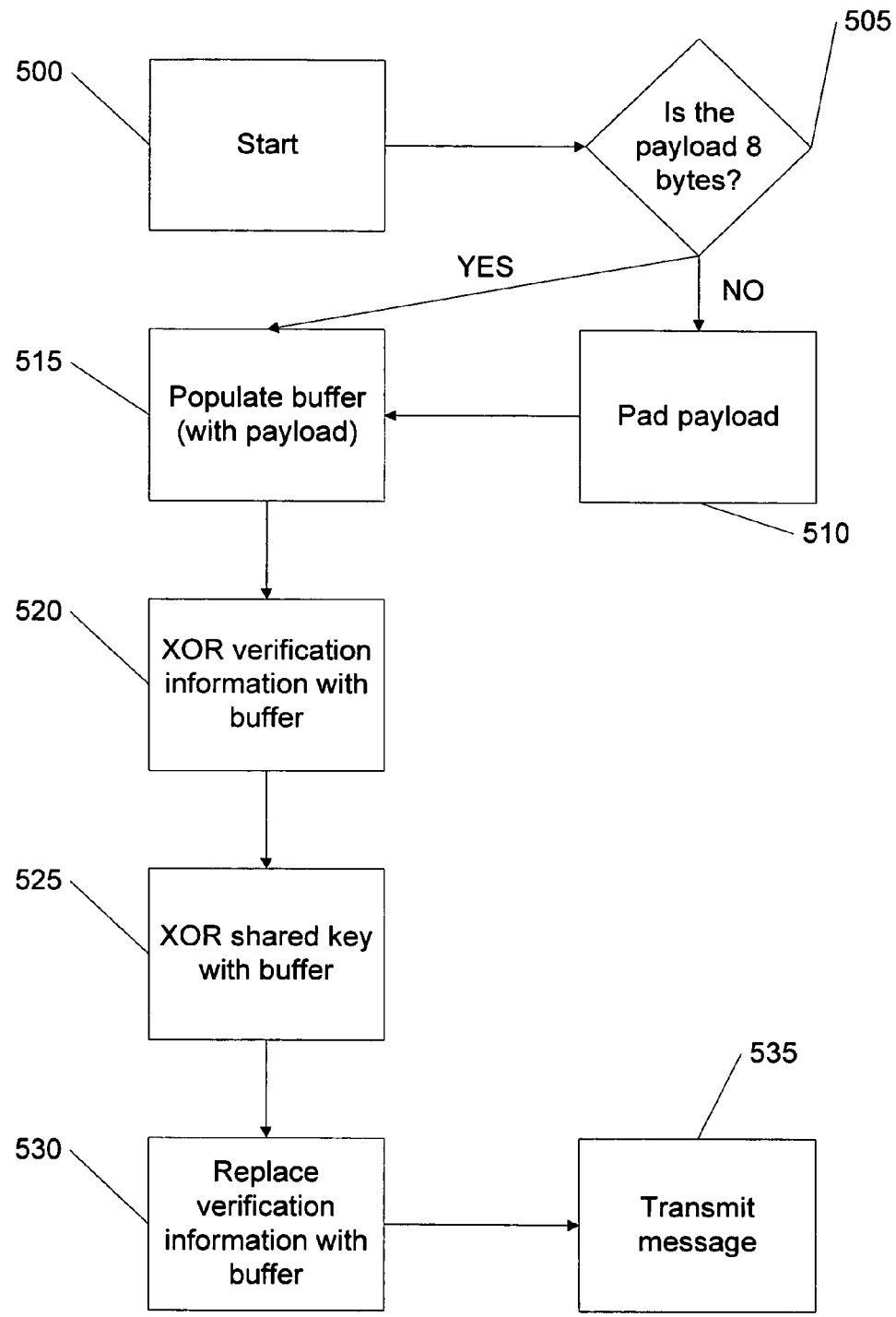
FIG. 7 is a flowchart which describes an exemplary method used to encode an information message.

FIG. 7 is a flowchart which describes an exemplary method used to encode verification information to produce an encoded information message. As noted above, verification information is any information whose value and position in a message is known by both the sender and receiver. As explained in further detail below, the verification information is scrambled using a key shared between the sender and the receiver. The purpose of scrambling the verification information using a shared key is to ensure that the intended receiver of the encoded information message can verify that it is indeed the intended recipient of the encoded information message. The verification information is scrambled, as opposed to encrypted, so that a recipient of an encoded information message can determine quickly and inexpensively whether or not it is the intended recipient of the encoded information message.

In a preferred embodiment, the steps described in FIG. 7 occur at a server. The server is preferably configured to notice the arrival of messages at an external server and forward them on to a mobile communications device. In this configuration, the arrival of a message, comprising payload information, such as an email, at an external server indicates to the server that an encoded information message, containing the payload information of the message, must be generated for transmission to a mobile device. The message which has arrived at the external server contains payload information which must be sent to a mobile communications device. In the example shown if FIG. 7, the process of encoding begins at step 500 when the server is notified that a message has arrived which must be encoded into an encoded information message.

The steps described in FIG. 7 could also occur in a mobile device. The mobile device is preferably configured to send messages to an intended recipient upon request by a user. In this configuration, the user enters a message and subsequently indicates to the mobile device that the message is ready to be sent to the message's intended recipient (through widely known means, such as pressing a send button) while using a messaging application. Upon receiving this indication from the user, the mobile device knows that a message must be generated for transmission. The message is herein subsequently referred to as the message or payload and the user's indication that it is ready to be sent is sufficient for entry into step 500.

Regardless of whether the steps shown in FIG. 7 are occurring at a server or at a mobile device, upon arrival at step 500, payload information is ready to be transmitted as an encoded information message to another entity, such as another server or mobile device. At step 505 payload information 230 is checked for length. If payload information 230 is not an appropriate length (8 bytes for example), payload information 230 is padded, preferably with zeroes, to obtain the desired length. In step 515, a buffer is populated to contain either the specified length (8 bytes for example) of the payload information 230, or the last bytes of the payload information 230 padded to the appropriate length with zeroes. At step 520, the appropriate length of the verification information 236 (8 bytes for example) is XORed with the buffer contents, with the result being stored in the buffer, overwriting the buffer's original content. At step 525, the resulting eight bytes now in the buffer are XORed with at least a portion of the shared key (8 bytes for example), once again storing the result in the buffer, overwriting the buffers' contents. It should be evident to those in the art that the preferred embodiment of eight bytes is in no way limiting, and this length could be any other desired length, 16 bytes or 32 bytes for example. It should also be easily seen by those skilled in the art that steps 520 and 525 do not need to occur in order and could occur in the reverse order with the same result or step 520 could be omitted, in this embodiment, the buffer would be populated with the verification information prior to step 525. It should also be easily seen by those skilled in the art that at step 515 the buffer need not be populated with the payload information, the buffer could also be populated with the verification information or the shared key or several buffers could be used, also, step 515 could be omitted. Another embodiment would remove the requirement for steps 505, 510, 515 and 520. An XOR operation is used to scramble the verification information because it is reversible with the knowledge of the shared key; however any other reversible, information preserving encoding operation could be used. At step 530, the eight bytes of the verification information are replaced with the buffer and the data contained in the buffer is combined with the payload information, generating an encoded information message. The combination operation which occurs at step 530 requires that the verification information be combined with the payload information in a manner such that both the sender and the receiver of the encoded information message will be able to identify which bits or bytes of the encoded information message are verification information and which bits or bytes are payload information. In the case of the encoded information message described in FIG. 2, step 530 would combine the verification information with the payload information so that the verification information is placed in the appropriate fields (236) of the encoded information message's header. In the case of the encode information message described in FIG. 3, step 530 would combine the verification information with the payload information so that the verification information is placed in the appropriate fields (237) of the encoded information message's footer. In the case of the encoded information message described in FIG. 4, step 530 would combine the verification information with the payload information so that the verification information is split into the appropriate parts (213, 228) and is placed in the appropriate locations in the encoded information message. The encoded information message is now ready to be transmitted, at step 535, to a recipient who can properly ascertain that the message is intended for them by using the method described in FIG. 8.

Figure 8:
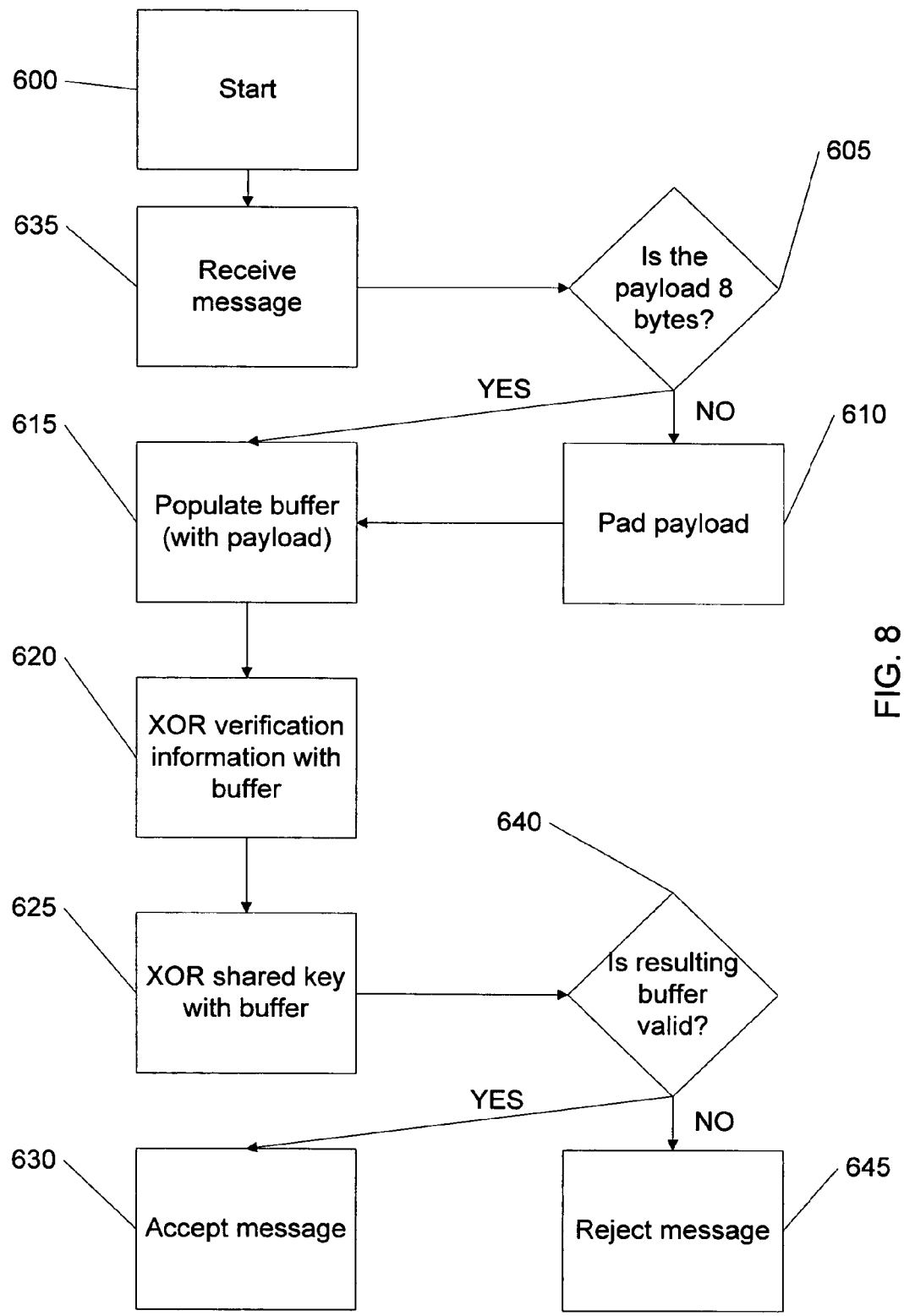
FIG. 8 is a flowchart which describes an exemplary method used to decode an encoded information message.

FIG. 8 is a flowchart which describes the method used to decode any encoded information messages received and ensure that the decoder of the encoded information message is the intended recipient. The flowchart described in FIG. 8 could occur in either a server or a mobile device. Starting at step 600, an encoded information message, containing payload information and verification information, is received at step 635. In the preferred embodiment where step 635 occurs in a server and the encoded information message is sent by a mobile device. In the preferred embodiment where step 635 occurs in a mobile device, the encoded information message would be sent by a server. In both cases, the message will arrive as an encoded information message which will have been encoded using the process described in FIG. 7. In step 615 a buffer is populated to contain eight bytes of payload information 230; if payload 230 is less than eight bytes in length, the buffer is padded to a length of eight bytes, preferably by appending zeroes in step 610. In step 620 eight bytes of the verification information are XORed with the buffer, storing the result in the buffer, overwriting the buffer's contents. In step 625 the resulting eight bytes in the buffer are XORed with eight bytes of the shared key, once again storing the result in the buffer, overwriting the buffer's contents. It should be evident to those in the art that the preferred embodiment of eight bytes is in no way limiting, and this length could be any other desired length. It should also be easily seen by those skilled in the art that steps 620 and 625 do not need to occur in order and could occur in the reverse order with the same result and that at step 615 the buffer could otherwise be populated with either the verification information or the shared key or multiple buffers could be used. In another embodiment, steps 605, 610, 615 and 620 could be omitted, in this embodiment, the buffer would be populated with the verification information prior to step 625. At step 640, the contents of the buffer are verified for validity, to ensure that the encoded information message is intended for this recipient. The test of validity is carried out by inspecting the decoded verification information to ensure that the decoded verification data conforms to the previously agreed to format for the verification information. For example, in the embodiment described in FIG. 2 the verification information validation involves inspecting Address Field 215 and Reserved Field 220 to ensure that they are composed entirely of zeroes, the predetermined verification information values. A final test which can also be carried out as part of step 640 while referring to FIG. 2 is to ensure that the resulting Frame Length Field 225 accurately describes the length of the encoded information message. In the case of the encoded information message described in FIG. 3, in step 640 verification fields 237 are examined to ensure that the values contained in verification fields 237 conform to predetermined values which are supposed to exist in the verification fields. In the case of the encoded information message described in FIG. 4, at step 630 the individual parts of the verification information (213, 228) are reassembled and the resulting, reassembled verification information is examined, if the values in the verification information match the predetermined values, validity is confirmed. If validity is not confirmed, the message is discarded in step 645. If validity is confirmed, in step 630 the valid resulting buffer is copied into the encoded information message over the scrambled data to result in the decoded information message or the resultant payload information will be passed on to whomever it is destined.

By means of an abbreviated example, the process described in FIG. 7 and FIG. 8 can more clearly be seen. For this example, 8 are used bits instead of 8 bytes but the extension to the 8 byte model will be clearly evident to those in the art.

Input Parameters:

| | | |
|---|---|---|
| Last 8 Bits of the Unencoded Header (subsequently 'A'): | | 00000011 |
| Last 8 Bits of the Message (subsequently 'B'): | | 10111010 |
| Last 8 Bits of the Shared Key (subsequently 'C'): | | 01010101 |
| Step 520: | A XOR B = | 10111001 |
| Step 525: | ( A XOR B ) XOR C = | 11101100 |
| Step 535: | Transmitted = | 11101100 |
| Step 636: | Received = | 11101100 |
| Step 625: | (( A XOR B ) XOR C ) XOR C = | 10111001 |

-continued

| | | |
|---|---|---|
| Step 620: | (( A XOR B ) XOR C ) XOR C ) XOR B = | 00000011 |
| Step 640: | (( A XOR B ) XOR C ) XOR C ) XOR B = A = TRUE | |

Steps 520, 525 and 535 occur at an originating processor. Steps 636, 625, 620 and 640 occur at a destination processor. As demonstrated above, if a portion of the unencoded header is predetermined and known to both the originating processor and the destination processor, at step 640 we can perform verification with a verifying operation that includes asserting that a predetermined portion of the decoded header matches the predetermined value (in this case 00000011). In this contrived example, the entire 8 bits match, but as will be understood by those in the art, this is easily applied to a predetermined header of any size. As can be seen in the example above, only someone with knowledge of the shared key (C) can properly decode the header to receive the desired result and validate that they are the intended recipient of the message. Without knowledge of the shared key, it becomes increasingly difficult to maliciously spoof a message. A message sent and received using the methods described above and in FIG. 7 and FIG. 8 secures a message through the removal of a recipient address from the message header.

The above described apparatus and methods are preferably practiced in a mobile email environment, wherein the messages being sent between mobile devices and server are email messages. It should be understood by those in the art that these messages could be other types of messages such as SMS, MMS or data messages such as web pages.

While the preferred embodiments of the invention have been illustrated and described, it is to be understood that this invention is not limited to what has been described. Numerous modification, changes, variations, substitutions and equivalents will occur to those skilled in the art without departing from the spirit and scope of the present invention as defined by the appended claims.

What is claimed is:

1. A method in a computing device for communicating payload information, the method comprising:
   providing verification information;
   scrambling, in the computing device, a portion of the verification information; and
   transmitting, from the computing device, a network layer message with the payload information and the scrambled verification information portion but without a recipient address, wherein the scrambled verification information is provided instead of the recipient address of the recipient device.

2. The method of claim 1 wherein the verification information comprises:
   a reserved field; and
   a frame length field.

3. The method of claim 1 wherein the payload information is one of an email message or a portion of an email message.

4. The method of claim 1 wherein the steps of providing, scrambling and transmitting are executed in a computing device comprising a mobile device.

5. The method of claim 1 wherein the steps of providing, scrambling and transmitting are executed in a computing device comprising a server.

6. The method of claim 1 wherein the network layer message is an IP layer message and the recipient address is an IP address of the recipient device.

7. The method of claim 1 wherein said scrambled verification information portion is transmitted as one of a header to the payload information or a footer to the payload information.

8. The method of claim 1 wherein said scrambled verification information portion is transmitted as a plurality of parts interspersed within the payload information.

9. The method of claim 1 wherein the step of scrambling comprises performing a reversible information preserving operation on the verification information portion.

10. The method of claim 9 wherein the reversible information preserving operation is an XOR operation.

11. The method of claim 10 wherein the XOR operation uses a shared key.

12. The method of claim 1 wherein the scrambled verification information portion is transmitted in replacement of a portion of packaging information.

13. A method in a recipient device for processing transmitted payload information incorporated into a network layer message which further includes scrambled verification information, the recipient device having a recipient address assigned thereto, the method comprising:
receiving, at the recipient device, the network layer message which includes the scrambled verification information but excludes the recipient address of the recipient device;
descrambling, the recipient device at least a portion of the scrambled verification information from the network layer message;
comparing said descrambled verification information with predetermined verification information; and
processing said payload information based on said comparison, wherein the scrambled verification information is provided instead of the recipient address in the network layer message.

14. The method of claim 13 wherein the descrambled verification information comprises:
a reserved field; and
a frame length field.

15. The method of claim 13 wherein the payload information is one of an email message or a portion of an email.

16. The method of claim 13 wherein the steps of receiving, descrambling, comparing and processing are executed in a recipient device comprising a mobile device.

17. The method of claim 13 wherein the steps of receiving, descrambling, comparing and processing are executed in a recipient device comprising a server.

18. The method of claim 13 wherein the scrambled verification information is one of a header of the payload information, a footer of the payload information or interspersed as a plurality of parts within the payload information.

19. The method of claim 13 wherein the step of descrambling comprises performing a reversible information preserving operation on the scrambled verification information.

20. The method of claim 19 wherein the reversible information preserving operation is an XOR operation.

21. The method of claim 20 wherein the XOR operation uses a shared key.

22. The method of claim 13 wherein the network layer message is an IP layer message and the recipient address is an IP address of the recipient device.

23. A computing device configured to communicate payload information to a recipient device having a recipient address assigned thereto, the computing device comprising:
an information providing module adapted to provide verification information in a network layer message;
a scrambling module adapted to scramble a portion of the verification information in the network layer message; and
wherein the information providing module is further adapted to transmit the network layer message with the payload information and the scrambled verification information portion but without the recipient address of the recipient device, wherein the scrambled verification information is provided instead of the recipient address of the recipient device.

24. The computing device of claim 23 with the verification information comprising:
a reserved field; and
a frame length field.

25. The computing device of claim 23 wherein the computing device is a server.

26. The computing device of claim 23 wherein the computing device is a mobile device.

27. The computing device of claim 23 wherein prior to said information providing module providing said verification information, said information providing module is further adapted to receive said payload information from an external server.

28. The computing device of claim 23 wherein said scrambling module is further adapted to scramble the portion of the verification information using a reversible information preserving operation.

29. The computing device of claim 28 wherein the reversible information preserving operation is an XOR operation.

30. A computing device configured to process transmitted payload information incorporated into a network layer message which further includes scrambled verification information, the recipient device having a recipient address assigned thereto, the computing device comprising:
a receiving module adapted to receive the network layer message which includes the scrambled verification information but excludes the recipient address of the recipient device;
a descrambling module adapted to descramble at least a portion of the scrambled verification information from the network layer message;
a comparing module adapted to compare said descrambled verification information portion with predetermined verification information; and
a processing module adapted to process said payload information based on said comparison, wherein the scrambled verification information is received instead of the recipient address of the recipient device.

31. The computing device of claim 30 wherein said computing device is a server.

32. The computing device of claim 30 wherein said computing device is a mobile device.

33. The computing device of claim 30 wherein said descrambling module is further adapted to perform a reversible information preserving operation to decode said scrambled verification information portion.

34. The computing device of claim 33 wherein the reversible information preserving operation is an XOR operation.

* * * * *